(12) United States Patent
Aota et al.

(10) Patent No.: US 11,702,101 B2
(45) Date of Patent: Jul. 18, 2023

(54) AUTOMATIC SCENARIO GENERATOR USING A COMPUTER FOR AUTONOMOUS DRIVING

(71) Applicant: INTERNATIONAL BUSINESS MACHINES CORPORATION, Armonk, NY (US)

(72) Inventors: Kentaro Aota, Aichi (JP); Yoshifumi Sakamoto, Shiga-ken (JP); Hitoshi Kadoi, Aichi-ken (JP); Yoshikazu Yamamoto, Aichi-ken (JP); Masao Kasuya, Aichi-ken (JP); Junya Nishina, Aichi-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 16/804,737

(22) Filed: Feb. 28, 2020

(65) Prior Publication Data

US 2021/0269058 A1    Sep. 2, 2021

(51) Int. Cl.
*B60W 60/00* (2020.01)
*G01C 21/34* (2006.01)

(52) U.S. Cl.
CPC .... *B60W 60/0011* (2020.02); *B60W 60/0025* (2020.02); *G01C 21/3453* (2013.01)

(58) Field of Classification Search
CPC ................................................. B60W 60/0011
See application file for complete search history.

(56) References Cited

U.S. PATENT DOCUMENTS 9,165,477 B2    10/2015    Wilson
10,345,811 B2    7/2019    Phillips et al.
(Continued)

FOREIGN PATENT DOCUMENTS

CN    108304986 A    7/2018
CN    108765235 A    11/2018
(Continued)

OTHER PUBLICATIONS

Pawel Gora, Traffic Simulation Framework—A Cellular Automaton-Based Tool for Simulating and Investigating Real City Traffic, Jan. 2009, ISBN 978-83-60434-59-8, pp. 641-653 (Year: 2009).*
(Continued)

*Primary Examiner* — Khoi H Tran
*Assistant Examiner* — Tristan J Greiner
(74) *Attorney, Agent, or Firm* — Tutunjian & Bitetto, P.C.; Michael. A. Petrocelli

(57) ABSTRACT

A computer implemented method for scenario generation for autonomous vehicle navigation that can include defining a cellular automaton layer that defines a road network level behavior with at least one rule directed to pathways by vehicles on a passageway for travel. The method may further include defining an active matter layer that defines a vehicle level behavior with at least one rule directed to movement of the vehicles on an ideal route for the pathways; and defining a driver agent layer that defines driving nature with at least one rule that impacts changes in the vehicle level behavior dependent upon a characterization of driver behavior. The method may further include combining outputs from the different layer to provide scenario generations for autonomous vehicle navigation. The combining of the outputs can utilize a pseudo random value to determine at an order in the execution and duration of execution for the layers.

20 Claims, 11 Drawing Sheets

(56) References Cited

U.S. PATENT DOCUMENTS

| | | |
|---|---|---|
| 2012/0310521 A1 | 12/2012 | Takeuchi |
| 2016/0005313 A1 | 1/2016 | Cholayil |
| 2016/0253902 A1 | 9/2016 | Yokoi et al. |
| 2017/0124505 A1 | 5/2017 | Nakfour et al. |
| 2017/0132117 A1 | 5/2017 | Stefan et al. |
| 2017/0147722 A1* | 5/2017 | Greenwood ............ G06N 3/126 |
| 2017/0300657 A1* | 10/2017 | Barrett .................... G16H 50/50 |
| 2018/0149487 A1 | 5/2018 | Lee et al. |
| 2018/0211120 A1 | 7/2018 | Smith et al. |
| 2019/0061776 A1 | 2/2019 | Kindo |
| 2019/0065933 A1 | 2/2019 | Bogdoll et al. |
| 2019/0108384 A1 | 4/2019 | Wang et al. |
| 2019/0129436 A1* | 5/2019 | Sun ........................... G06N 3/08 |
| 2019/0163181 A1 | 5/2019 | Liu et al. |
| 2019/0179738 A1 | 6/2019 | Hawthorne et al. |
| 2019/0235521 A1 | 8/2019 | Mudalige et al. |
| 2019/0236380 A1 | 8/2019 | Fukuhara et al. |
| 2019/0355256 A1 | 11/2019 | Bielby |
| 2020/0082727 A1 | 3/2020 | Zhao |
| 2020/0180647 A1 | 6/2020 | Anthony |
| 2020/0193721 A1 | 6/2020 | Khim et al. |
| 2020/0365013 A1 | 11/2020 | Simon et al. |
| 2021/0182581 A1 | 6/2021 | Usui et al. |
| 2021/0237772 A1 | 8/2021 | Meltz et al. |
| 2021/0334420 A1 | 10/2021 | Du |

FOREIGN PATENT DOCUMENTS

| | | |
|---|---|---|
| CN | 108961798 A | 12/2018 |
| CN | 109871599 A | 6/2019 |
| CN | 109885870 A | 6/2019 |
| CN | 110352153 A | 10/2019 |
| CN | 110544380 A | 12/2019 |
| JP | H09211678 A | 8/1997 |
| JP | H11272158 A | 10/1999 |
| JP | 2002163747 A | 6/2002 |
| JP | 2008217113 A | 9/2006 |
| JP | 2008117082 A | 5/2008 |
| JP | 2008299458 A | 12/2008 |
| JP | 2009245042 A | 10/2009 |
| JP | 2015090679 A | 5/2015 |
| JP | 2016534325 A | 11/2016 |
| JP | 2017036135 A | 2/2017 |
| JP | 2017068712 A | 4/2017 |
| JP | 2017173309 A | 9/2017 |
| JP | 2018077835 A | 5/2018 |
| JP | 2019043157 A | 3/2019 |
| JP | 2019512824 A | 5/2019 |
| JP | 2019114005 A | 7/2019 |
| WO | 2004008744 A | 1/2004 |
| WO | 2018101851 A | 6/2018 |

OTHER PUBLICATIONS

Lawrence Lan, Cellular Automaton Simulations for Mixed Traffic with Erratic Motorcycles' Behavior, Jan. 28, 2010, Physica A 389, pp. 2077-2089. (Year: 2010).*

Liu Ming-Zhe, A Cellular Automaton Model for Heterogeneous and Inconsistent Driver Behavior in Urban Traffic, Nov. 15, 2012, Communications in Theoretical Physics vol. 58, No. 5, pp. 744-748. (Year: 2012).*

Marcelo Zamith, A Cellular Stochastic Cellular Automata Model for Traffic Flow Simulation with Drivers' Behavior Prediction, Apr. 18, 2015, Journal of Computational Science 9, pp. 51-56. (Year: 2015).*

USPTO Transmittal Form PTO/SB/21 (Jul. 2009), dated Apr. 14, 2021, pp. 1-2.

Kuzumaki, S., "What about Japan's autonomous driving following death accident in the United States?" https://newswitch.jp/p/13269 (Jun. 2018) pp. 1-14.

Nakata, A., "Autonomous driving technology understands the development capabilities of Dantotsu and Weimo by numbers" Silicon Valley Next Report (Feb. 2018) pp. 1-3.

Yoshida, J., "Driving Development Increase the Importance of Simulation?" EE Times (Apr. 2018) pp. 1-5.

Ohnsman, A., "Declaration of automatic driving realized by Toyota president "14.2 billion km test run"" Forbes Japan (Oct. 2016) pp. 1-4.

Yikai, K. et al., "Simulation of Drivers Maneuvering around obstacles and analysis of Traffic congestion using Network-structured models based on fuzzy inferences" (Dec. 2001) pp. 90-97, vol. 42, No. SIG 24, English abstract.

Fujii, H. et al., "Modeling of Traffic Accident in Multi-agent-based Traffic Simulator" (Jan. 2011) pp. 42-49, English abstract.

Mell, P. et al., "The NIST Definition of Cloud Computing" NIST Special Publication (2011) 7 pages.

International Search Report and Written Opinion dated May 7, 2021 in related PCT Application No. PCT/IB2021/050700, pp. 1-9.

List of IBM Patents or Patent Applications Treated as Related dated Aug. 31, 2021, 2 pages.

U.S. Office Action issued in U.S. Appl. No. 16/804,813 dated May 10, 2022, 70 pages.

* cited by examiner

AUTOMATIC SCENARIO GENERATOR USING A COMPUTER FOR AUTONOMOUS DRIVING

BACKGROUND

The present invention generally relates to autonomous vehicles, and more particularly to evaluation methods for simulation environments used in developing autonomous vehicles.

For automobile original equipment manufacturers (OEM) and supplier companies, development of autonomous-driving vehicles is no longer avoidable. In the development of autonomous driving vehicles, importance of evaluation with simulation environment is becoming as important as the actual driving test. In autonomous driving development, the mileage on public roads is often used as the index to measure the maturity of development of vehicles under development. However, there are limits to tests of driving on public roads. One potential limit is sufficiency of testing. For example, although it is considered that a driving distance necessary for ensuring safety in autonomous driving is 10 to 14 billion kilometers, it is generally not realistic to conduct driving tests for several years until such driving distance is reached. Further, it is difficult to intentionally reproduce a situation that can to a serious accident or a fatal accident in actual driving. In some instances, it is important to solve rare situations that should be avoided by evaluating in a simulation environment while continuing verification tests on public roads.

SUMMARY

In accordance with an embodiment of the present invention, a computer implemented method is provided for scenario generation for autonomous vehicle navigation. In some embodiments, the method may include defining a cellular automaton layer that defines a road network level behavior with at least one rule directed to pathways by vehicles on a passageway for travel. The method may also define an active matter layer that defines a vehicle level behavior with at least one rule directed to movement of the vehicles on an ideal route for the pathways by the vehicles for the passageway for travel. In some embodiments, the method includes defining a driver agent layer that defines driving nature with at least one rule that impacts changes in the vehicle level behavior dependent upon a characterization of driver behavior. The method may combine outputs from the cellular automaton layer, the active matter layer and the driver agent layer to provide scenario generations for autonomous vehicle navigation. Combining the outputs can employ a pseudo random value to determine at an order in the execution of the cellular automaton layer, the active matter layer and the driver agent layer. Combining the outputs can employ a pseudo random value to determine the duration of execution of the cellular automaton layer, the active matter layer and the driver agent layer in providing the scenario generations for autonomous vehicle navigation.

In another aspect, a system for scenario generation for autonomous vehicle navigation is provided. The system may include a map extractor for setting a pseudo random value. The system may include a cellular automaton layer generator that defines a road network level behavior with at least one rule directed to pathways by vehicles on a passageway for travel. The system may include an active matter layer generator that defines a vehicle level behavior with at least one rule directed to movement of the vehicles on an ideal route for the pathways by the vehicles for the passageway for travel. The system may further include a driver agent layer generator that defines driving nature with at least one rule that impacts changes in the vehicle level behavior dependent upon a characterization of driver behavior. In some embodiments, the system includes a scenario converger including at least one processor for combining outputs from the cellular automaton layer, the active matter layer and the driver agent layer to generate scenario generation for autonomous vehicle navigation. The pseudo random value may also be employed to determine an order in the execution of the cellular automaton layer, the active matter layer and the driver agent layer in generating the scenario generation for autonomous vehicle navigation. The combining of the outputs may employ the pseudo random value to determine the duration of execution of the cellular automaton layer, the active matter layer and the driver agent layer in generating the scenario generation for autonomous vehicle navigation.

In yet another aspect, the present disclosure provides a computer program product for evaluating scenario generation for autonomous vehicle navigation. The computer program product may include a computer readable storage medium having program instructions embodied therewith, the program instructions executable by a processor. The program instructions can cause the processor to define a cellular automaton layer that defines a road network level behavior with at least one rule directed to pathways by vehicles on a passageway for travel. The program instructions can also cause the processor to define an active matter layer that defines a vehicle level behavior with at least one rule directed to movement of the vehicles on an ideal route for the pathways by the vehicles for the passageway for travel. The program instructions can also cause the processor to define a driver agent layer that defines driving nature with at least one rule that impacts changes in the vehicle level behavior dependent upon a characterization of driver behavior. The program instructions can also cause the processor to combine outputs, using the processor, from the cellular automaton layer, the active matter layer and the driver agent layer to provide scenario generations for autonomous vehicle navigation. The combining of the outputs employing a pseudo random value to determine at an order in the execution of the cellular automaton layer, the active matter layer and the driver agent layer and the duration of execution of the cellular automaton layer, the active matter layer and the driver agent layer in providing the scenario generations for autonomous vehicle navigation.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
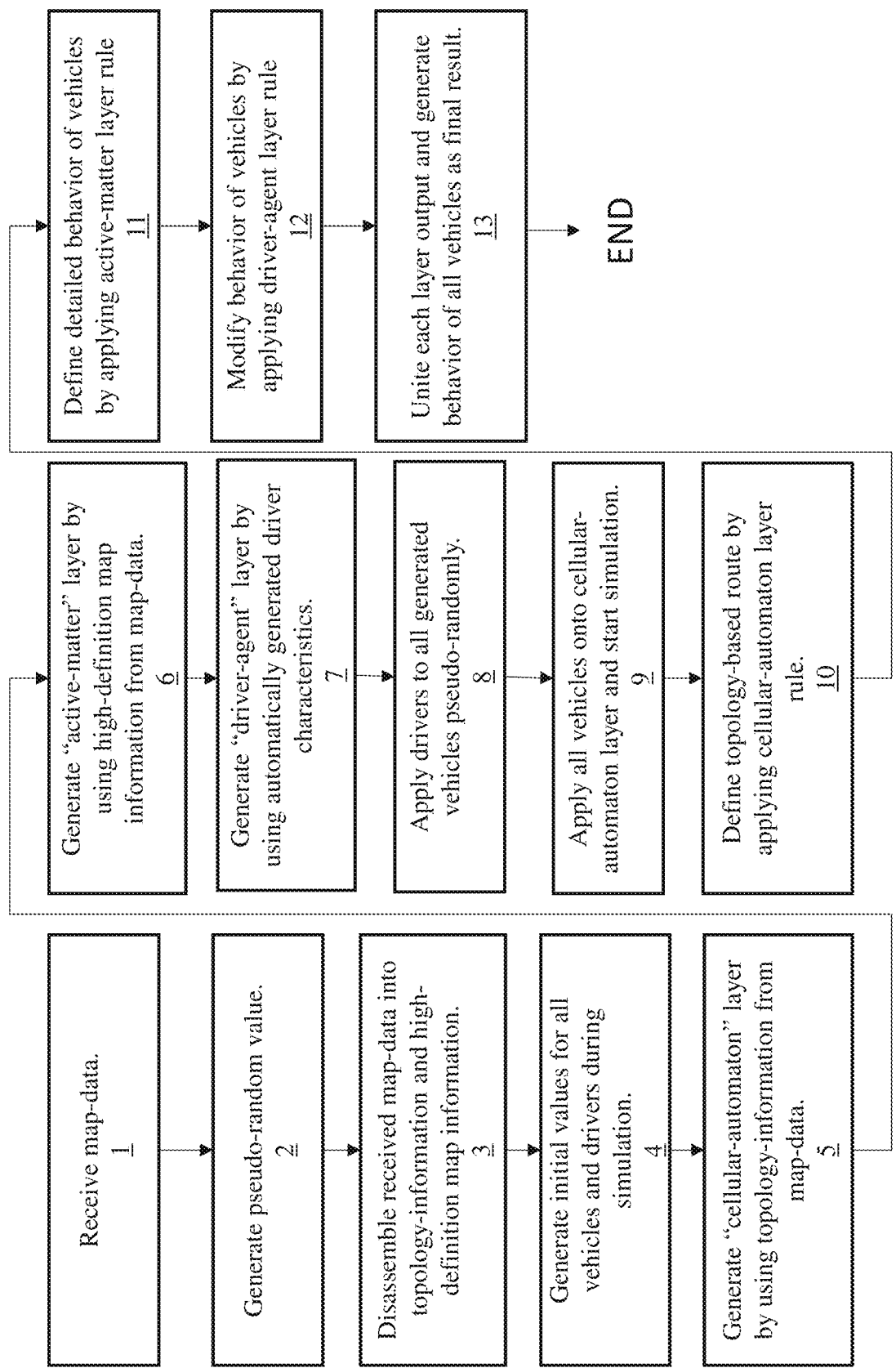
FIG. 1 is a block/flow diagram of a method of automatic scenario generation for autonomous driving vehicles, in accordance with an embodiment of the present invention.

In some embodiments, the methods, systems and computer program products of the present disclosure can provide an automatic scenario generator with a high reproducibility for autonomous driving. Testing of autonomous vehicles on public roads have a number of limitations. One potential limit is sufficiency of testing, which involves the number of test miles that are sufficient to fully develop autonomous vehicles. The high number of test miles for test sufficiently results in a time intensive test. Further, it is can be difficult to reproduce a situation that leads to a serious accident or a fatal accident in actual driving.

For coverage of these "verification scenarios" by simulation, there are some technical problems to overcome. First, it is can be difficult to extract all events which are logically possible, but very unlikely to occur physically. In particular, it is not realistic to extract not only scenarios relating to behaviors of an autonomous driving vehicle itself, but also verification scenarios that should be expected for the cases where there are multiple vehicles running in the periphery of the autonomous driving vehicle (which are not autonomous driving vehicles) as to how they are "likely to" behave, relying on a person's (including domain specialists) knowledge and the regular rules only.

These verification scenarios should be automatically generated efficiently, with very short time. In other words, it is necessary to mechanically generate them with a limited number of parameters as inputs, which is, however, incompatible with the first problem (difficulty of extraction according to known knowledge and rules).

The extracted verification scenarios should be reproducible. If the result of verification on a scenario is unfavorable, analysis of the cause and confirmation of the effect of a countermeasure can be valuable. Therefore, generation of a huge number of intended verification scenarios such as those mentioned above can include a large number of complex parameters (sometimes including dynamic changes), and the existence of such parameters is often incompatible with reproducibility.

In the methods, systems and computer program products of the present disclosure, a verification scenario is refined in a stepwise manner by gathering a plural layers each having a rule for different grain size or behaviors. By combining each "element of behavior", which are drive straight, accelerate, decelerate, lane change, or keep distance between preceding vehicle, the methods, systems and computer program products described herein can enable the generation of very rare, e.g., low incidence, scenarios automatically, within few defined rules. The rules are combined in a unbiased manner with high probability, by using pseudo-random value to determine the order of execution, the durations of execution and intervals for each layer. The rule each layer itself is as simple as possible, and input and output can be kept in a unique relationship. Consequently, an intended scenario can be reproduced by storing parameters at the time of a start of a simulation or a intended point of time during the simulation. The methods, systems and computer program products of the present disclosure are now discussed in greater detail with reference to FIGS. 1-11.

Figure 2:
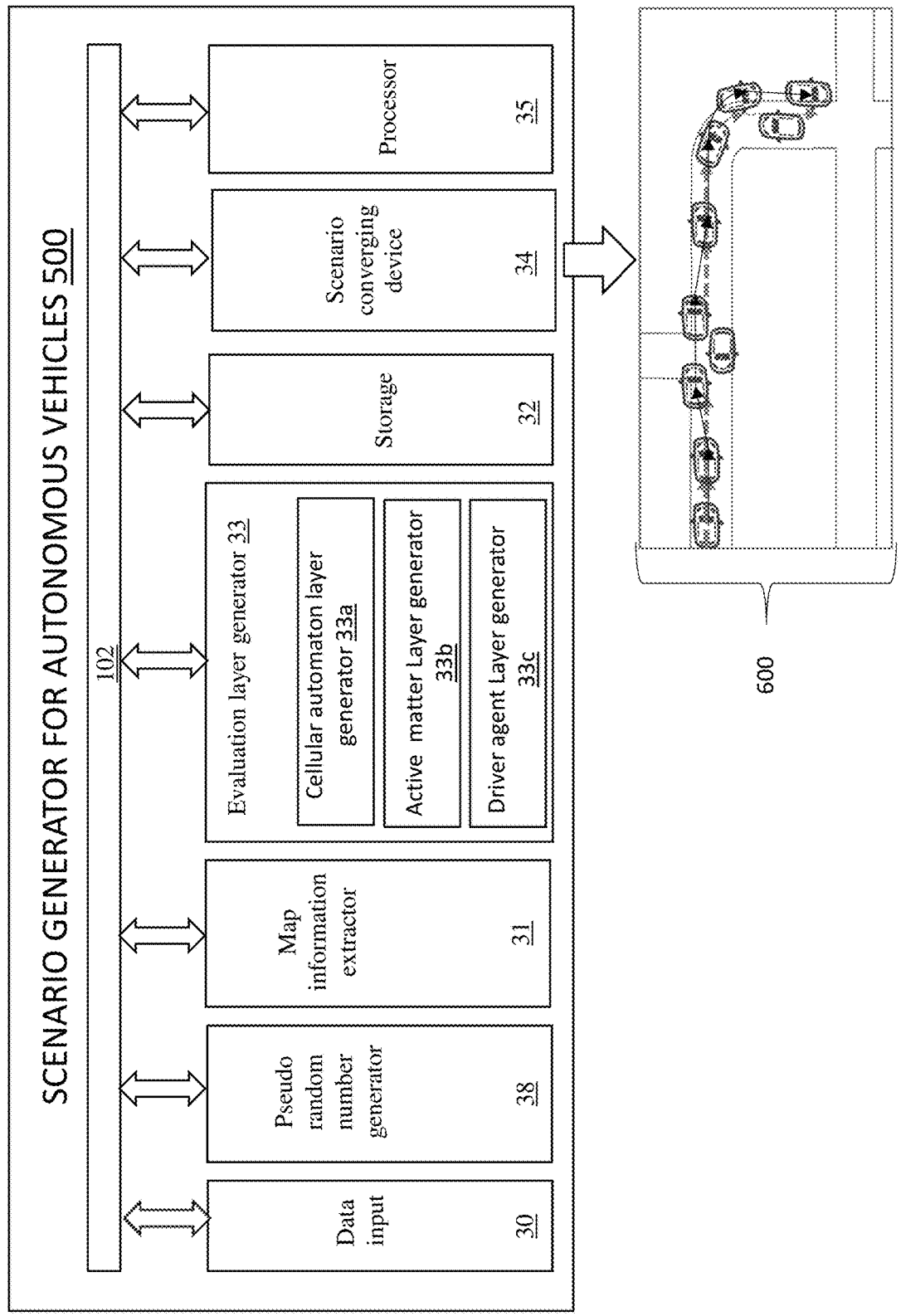
FIG. 2 is a block diagram of a system for automatic scenario generation for autonomous driving vehicles.

FIG. 1 is a block/flow diagram of a showing a method for automatic scenario generation with high reproducibility for autonomous driving applications. FIG. 2 is a block diagram of a system 500 for automatic scenario generation with high reproducibility for autonomous driving applications.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a process flow for one embodiment of an automatic scenario generator. In this process sequence, a verification scenario can be generated automatically and efficiently by pseudo-randomly combined outputs of layers having the three objectives indicated below via determination of the respective orders of execution, the durations of execution and the intervals in the respective layers.

Pseudo random values are used to provide any kind of variation in a dynamic scenario generator. For example, pseudo random values can be used where each of the vehicles are located, what the initial velocity for the vehicles are, and what kind of route the vehicles should travel on. In some embodiments, these parameters or selections are set "randomly" so that the system can generate various patterns of vehicle's behavior. Pseudo random values are employed, as opposed to pure random values, because the generated behaviors of the methods, systems and computer program products are reproducible.

The layers may include a section that generates a driving route, a section that generates a specific behavior of a vehicle, and a section that generates a particular behavior comes from driver's personality. In some embodiments, the output from the verification scenario enables a simulation that generally can not be provided using actual driving tests on autonomous driving vehicle development. In some embodiments, the method can generate vehicle behavior scenarios that will rarely occur in real world, based on the premise of physical interference among many vehicles and unspecified vehicles. In some embodiments, the method can generation of a large number of verification scenarios in a short time.

In some embodiments, the method can begin with block 1 of FIG. 1, which includes receiving map data. In some embodiments, the map data may be received through an input 30 to the automatic scenario generation system 500, as depicted in FIG. 2. In some embodiments, in addition to the map data, the system 500 may also receive vehicle information as an input. In some embodiments, receiving the map information and vehicle information as inputs from an operator, e.g., user of system of automatic scenario generation, includes converting the map information and vehicle information into an internal data definition. The internal data definition may include all the parameters, variables, data, etc. that is used in simulation systems. Map information and vehicle information are the input to be converted into the information in the system for generating simulations suitable for autonomous vehicle navigation.

Referring to FIG. 2, the map data may be imputed into the system 500 through an interface 30 for inputting map and/or vehicle information.

Referring to FIG. 1, in some embodiments, the method may generate the pseudo random values at block 2. In some embodiments, to generate pseudo random values and initial values from pseudo random value, the method may define a seed value. Any kind of value (number) is acceptable for the seed value. For example, in some embodiments, a timestamp can be employed as the seed value. In some embodiments, the seed value is given to a pseudo random value (number) generator. The pseudo random value generator can generate pseudo random values by executing pseudo random number generation iteratively. Generators often have plural tables which contains numbers aligned randomly, and defines which table to use by referencing seed value. In some embodiments, the methods employed herein use a random number from generator to generate a parameter, by converting with specific rules or functions, as required. For example, if the system 500 must decide one route from three selectable routes on branch, the system can use a remainder when the value is divided by three. In some embodiments, the pseudo random values are provided by a pseudo random number generator 38 of the system 500 for automatic scenario generation.

In some embodiments, generating the input information that is utilized to generate the evaluation scenario may include the input map being broken down and converted into useable pieces of information for the automatic scenario generator. In some examples, breaking the input map into data components, includes extracting route information from the input map. This may include processing the route information into an aggregate of cells and/or nodes and links indicative of routes on the roads. For example, block 3 of the process flow depicted in FIG. 1 can include disassembling the received map data into topology information and high definition map information at block 3. A high definition map (sometimes called as HD map) may be a map data format that contains various and precise information about road and geographical features, including static and dynamic information. In some embodiments, the topology information includes the shape of the roads. In some embodiments, road shape information can be provided by a group of continuous coordinates that provide the shape of the road.

Referring to FIG. 2, in some embodiments, the disassembly of the map inputs can be provided by a map info extractor 31 of the system for automatic scenario generation 500. In some embodiments, the map info extractor 31 may also provide the pseudo random number generator.

Referring to FIG. 1, the method may further include generating initial values for the vehicles and drivers that are represented in the simulation at block 4. In some embodiments, the number of vehicles and drives provided for the initial values is automatically generated and fully reproduceable by using the pseudo random value. In some embodiments, generating the initial values for the vehicles and drivers can be provided by driving rule information. Driving rule information can be information for determining how the vehicle runs on the route. Rules that can be restrictions when a vehicle runs on a real road (limited to those that can be quantified only) such as a recommended route (defined as a center line in the cells/links), a speed limit, the number of lanes and regulatory values, can be applied to the driving rule information.

In some embodiments, the input information may fail to include all of the of the above described forms of information. However, in some embodiments, in the event information is missing for the evaluation following disassembly of the received map data at block 3 and information is missing for generating the initial values for drivers and vehicles at block 4, lacking information may be determined using the pseudo-random value.

Referring to FIG. 2, in some embodiments, the pieces of initial information are recorded in a map and vehicle data storage device 32 of the system 500 for automatic scenario generation. The data stored in the storage device 32 of the system 500 can arbitrarily be read out. The recorded information are associated with the respective scenarios finally output, and are used when the respective scenarios are reproduced.

In some embodiments, the method may continue with allocating a cellular automaton layer, an active matter layer and a driver agent layer to all of the vehicles set. The verification scenario, e.g., simulation for autonomous vehicles, is generated automatically by the present methods, and effectively by the pseudo randomly combined outputs of layers having the three objectives. In some embodiments, the three layers may include the cellular automaton layer, which is a section that generates a driving route for the evaluation. In some embodiments, the three layers may include an active matter layer, which is a section that generates a specific behavior of a vehicle. In some embodiments, the three layers may further include a driver agent layer, which is a section that generates a particular behavior that is dependent upon driver personality.

In some embodiments, allocating the layers to the vehicles arranged on the simulator may include a verification scenario. The verification scenario is an output of the system for automatic scenario generation 500, which is generated by combining output results from the three layers with different rules. One of the three layers is the cellular automaton layer. For example, the cellular automaton layer at block 5 of the method can calculate each rough travel route from the shape of the road and the specified origin and destinations for each vehicles.

Referring to FIG. 1, in some embodiments, the method may progress to block 5 that includes generating a cellular automaton layer by using the topology information from the map data. In some embodiments, the road shape information that is extracted from the topology information from the map inputs may be extracted by the cellular automaton layer. A cellular automaton is a collection of "colored" cells on a grid of specified shape that evolves through a number of discrete time steps according to a set of rules based on the states of neighboring cells.

A second of the three layers is an active matter layer. Block 6 of the method depicted in FIG. 1 includes generating an active matter layer by using the high definition map information from the map data. In some embodiments, the active matter layer may calculate motion (behavior) based on the premise of the positional relationships and interference among the "group" of vehicles with the travel route specified above(in cellular automaton layer) as a target value.

A third of the three layers is the drive agent layer. At block 7 of the method depicted in FIG. 1, the driver agent layer can add irregular changes caused by drivers' personalities and conditions to the behaviors of the vehicles defined by the rules above.

Each layer, e.g., the cellular automaton layer, the active matter layer and the driver agent layer, is allowed to have different implementation methods and different rules as long as the above function are fulfilled. As an example, general roads and expressways are different from each other in applicable traffic rules (e.g., the speed limit), and thus, it is proper that this difference can be expressed by different rules in the cellular automaton layer. Likewise, a difference in behavior attributable to the difference in size and weight between general vehicles and large vehicles is expressed by different rules in the active matter layer and a difference in behavior during driving attributable to the difference in nature between young and old is expressed by different rules of the driver agent layer.

Layer generation for the evaluation, e.g., generation of the cellular automaton layer, the active matter layer and the driver agent layer, is provided by a evaluation layer generator 33 of the system 500 for automatic scenario generation. The evaluation layer generator 33 may include a cellular automaton layer generator 33a, an active matter layer generator 33b and a driver agent layer generator 33c.

Referring to block 8 of FIG. 1, in some embodiments, the method may include applying drivers to all generated vehicle pseudo-randomly. In some embodiments, the vehicles arranged on the simulator are automatically generated and one or more the followings attributes can be pseudo-randomly allocated to the vehicles:

i) Timing for generation of the vehicle (interval between generation of a certain vehicle and generation of a next vehicle)
ii) Coordinates of initial position of the vehicle (selected from a specific area)
iii) Coordinates of the destination of the vehicle (selected from the specific area)
iv) Driving speed at the time of generation of the vehicle (upper and lower limits are set)
v) Allocated cellular automaton. The allocated cellular automaton is the first layer to define vehicles rough, topological behavior (movement).
vi) Allocated active matter. "Active Matter" is a term for interacting substances or objects which have a mechanism to move autonomously, or complex movement as a result of interaction. It is characterized by the ability to generate very complex movement or ordered actions logically, in spite of very simple mechanism each substances have.
vii) Allocated driver agent. This layer that provides the allocated driver agent adds some kind of bias to the defined behavior (movement) of vehicles by two layers described above. Different drivers will behave differently under very same situations, like calm driver will slow down when other vehicle approaching, though aggressive driver may be accelerate. "Driver agent" layer modifies the internal parameters, like acceleration or handle operating amount, imitating as the real different drivers will behave.

Even though each of the attributes has only a limited number of cases, efficient scenario generation which cover the entire verification space is enabled by gathering the orders of execution and intervals of execution allocated by pseudo-random value.

Figure 3:
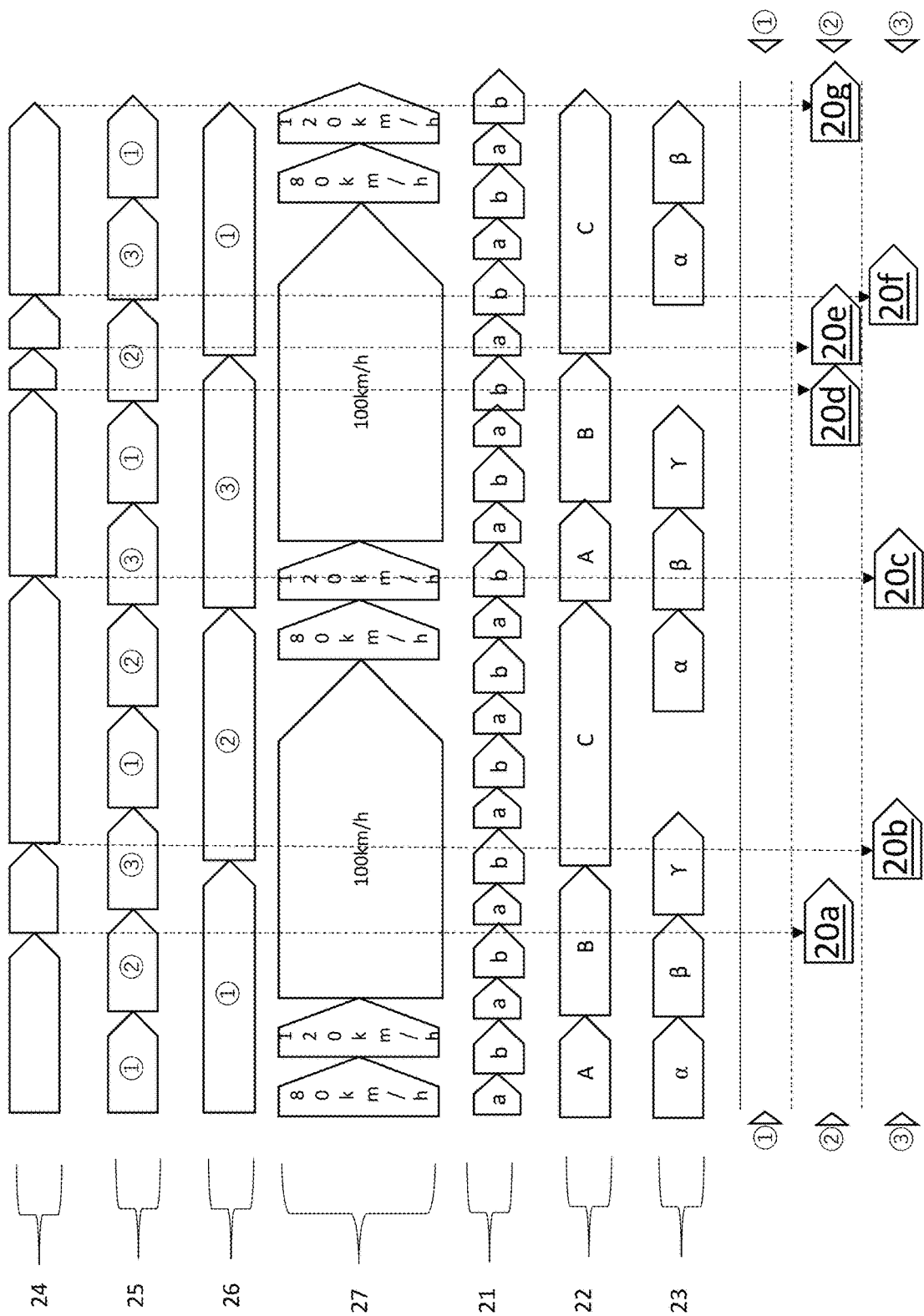
FIG. 3 illustrates one embodiment of a plot of the data from scenario generation for an autonomous vehicle, in which data from the cellular automaton layer, the active matter layer and the driver agent layer are depicted.

FIG. 3 illustrates one embodiment of a plot of the data from scenario generation for an autonomous vehicle, in which data from the cellular automaton layer, the active matter layer and the driver agent layer are identified by reference numbers 21, 22 and 23, respectively. The vehicles for which the data points of the scenario are being generated are identified by reference number 20. Also included in the scenario generation is timing for the generation of the vehicles behavior 24, start positions for where the vehicles are located during the scenario generation 25, the destination for the vehicles 26, and the velocity for the vehicles 27. In one example depicted in FIG. 3, a vehicle identified by reference number 20 was located at position "2", had a cellular automaton layer value of b, an active matter layer value of B, a driver agent layer value of 13, and was traveling at 100 km/hr. The vehicle identified by reference number 20 was also located at location 2. In the embodiment that is depicted in FIG. 3, the pseudo random value is the time for generation of a vehicle's behavior. In some embodiments, data points are provided as outputs by the vehicles having reference numbers 20a, 20b, 20c, 20d, 20e, 20f and 20g.

In some embodiments, the data provided at block 8 is saved in a form of memory 32, e.g., hardware memory, that provides a storage area for the system 500 for automatic scenario generation.

In some embodiments, the method may continue with applying the cellular automaton rule, and calculating the driving routes of all of the vehicles within an iteration period. Block 9 of the method depicted in FIG. 1 includes applying all vehicles on the cellular-automaton layer and starting the simulation. In some embodiments, applying all the vehicles on the cellular-automaton layer generates driving routes on the cellular automaton. In some embodiments, the role of the cellular automaton is to calculate progress of allocated vehicles along the cells/links during an iteration. First, each of the initial coordinates of the vehicles generated in the process steps described with reference to blocks 1-4 of the method depicted in FIG. 1 are approximated and allocated to any of the cells/nodes forming the route information that is also generated in the process steps described with reference to blocks 1-4 of the method depicted in FIG. 1. Furthermore, during block 9, the coordinate of each destination is also allocated to an approximate cell/node (hereinafter referred to as "destination cell/node").

The cellular-automaton layer has a rule travel complying with the definition of the cellular automaton, and each vehicle travels on an adjacent cell/node/link as far as possible toward the destination cell/node according to this rule during an iteration. This rule includes conditional branches referring to parameters such as a speed limit and lane information included in the driving rule information. Also, the route information may include a branch that branches in multiple directions; however, which branch to be selected is determined by pseudo-random value.

After determination of the travel on a cell/node/link in one iteration, a "preferred route" can be extracted from the cell/link the vehicle passes through. Block 10 of the method depicted in FIG. 1 includes defining a topology based route by applying the cellular automaton's layer rule. The preferred route includes continuous coordinates where the vehicle ideally travels through each cell/link and a speed of travel between the coordinates and these pieces of information form an output of the cellular automaton layer.

Figure 4:
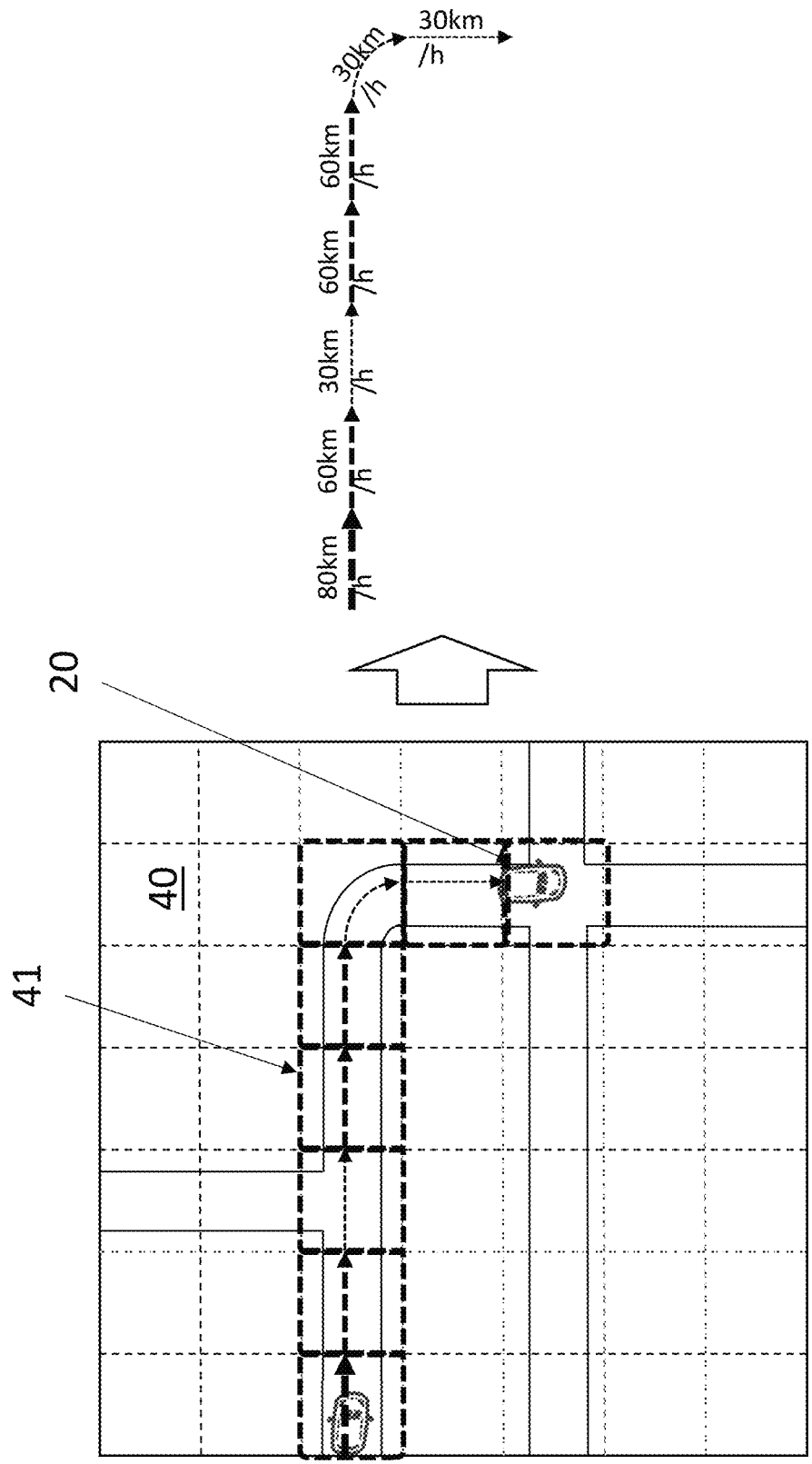
FIG. 4 is an illustration of one example of a preferred route of a vehicle on the cellular automaton.

FIG. 4 illustrates one example of an iteration of a "preferred route" that can be provided by blocks 9 and 10 of FIG. 1. A roadway 41 is plotted on the cellular automaton 40 that the vehicle 20 is traveling for on the preferred route. The output of the cellular automaton layer may include the route, e.g., roadway 41, as well as the speed at which the vehicle 20 is traveling on the route.

Where calculation using the cellular automaton is executed after a plural iterations, the coordinate of the vehicle allocated at the beginning of iteration may not be located on the "preferred route". In this case, a travel route to be outputted by the cellular automaton is expressed as offset position from preferred route.

The application of the vehicles onto the cellular automaton layer to start the simulation in combination with the generation of preferred routes may be provided by a cellular automaton generator 33a of the system 500 for automatic scenario generation.

The parameters input to the cellular automaton layer will be recorded in the storage device, memory 32, e.g., hardware memory, that provides a storage area for the system 500 for automatic scenario generation, and can arbitrarily be read out. The recorded pieces of information are associated with the specific scenarios finally output and are used when the intended scenarios are reproduced.

The method may continue at block 11 of FIG. 1, which includes defining the detailed behavior of vehicles by an active matter layer's rule. By applying active matter rule, the method may calculate behaviors of all of the vehicles within the iteration period. In some embodiments, the step provided in block 11 generates the behaviors of the vehicles on the active matter layer. The role of the active matter layer is to calculate how each of the vehicles actually travels when the vehicle intends to travel along the route calculated by cellular automaton layer, based on the premise that interference with the other vehicles present within a particular range occurs. The active matter layer has a rule that indicates how the vehicle should travel with the relative distances and relative angles, and relative speeds to any other vehicles. This rule for the active matter layer is configured by a combination of basic behaviors of the vehicle and conditions for changing the behaviors.

Figure 5:
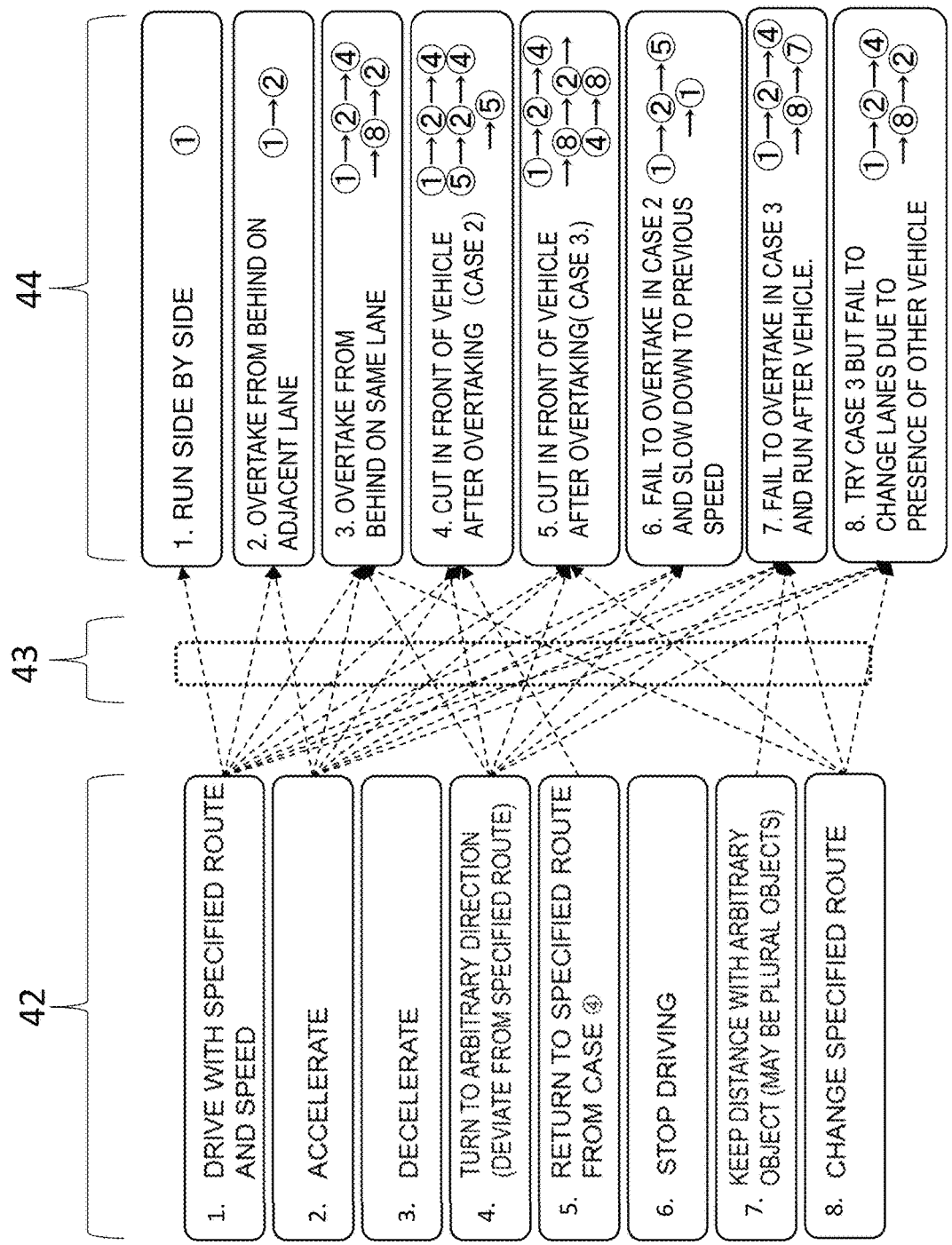
FIG. 5 is an illustration depicting rules for the active matter layer, in which the rules are directed to behaviors as an object and individual behaviors of a vehicle.

FIG. 5 is an illustration depicting one embodiment of the rules for the active matter layer. The rules are directed to behaviors, e.g., behaviors as an object 42 and individual behaviors as a vehicle 44. The behaviors as an object 42 can be characteristics directed to a changes in the motion of a vehicle, e.g., driving on a specified route at a specified speed, acceleration, deceleration, change in direction from the specified route, return to a specified route, keeping a distance from a particular object (e.g., peripheral vehicle), and combinations thereof. The individual behaviors as a vehicle 44 are behaviors of the vehicle that include one or more behaviors of objects. For example, for a vehicle to run side by side with a peripheral vehicle, the individual behavior as the vehicle 44 may include a behavior as an object 42 of driving with a specified route and speed. In another example, an individual behavior as a vehicle 44 may include the behaviors of an object 42 that can include driver with a specified route and speed, and accelerate. A plurality of other examples are provided in FIG. 5. The trigger for changing behavior 43, e.g., the individual behaviors of the vehicle, may include a change in a scenario that the vehicle is being exposed to. For example, a peripheral vehicle can change speed or direction that would impact the speed and direction of travel for the autonomous vehicle.

Figure 6:
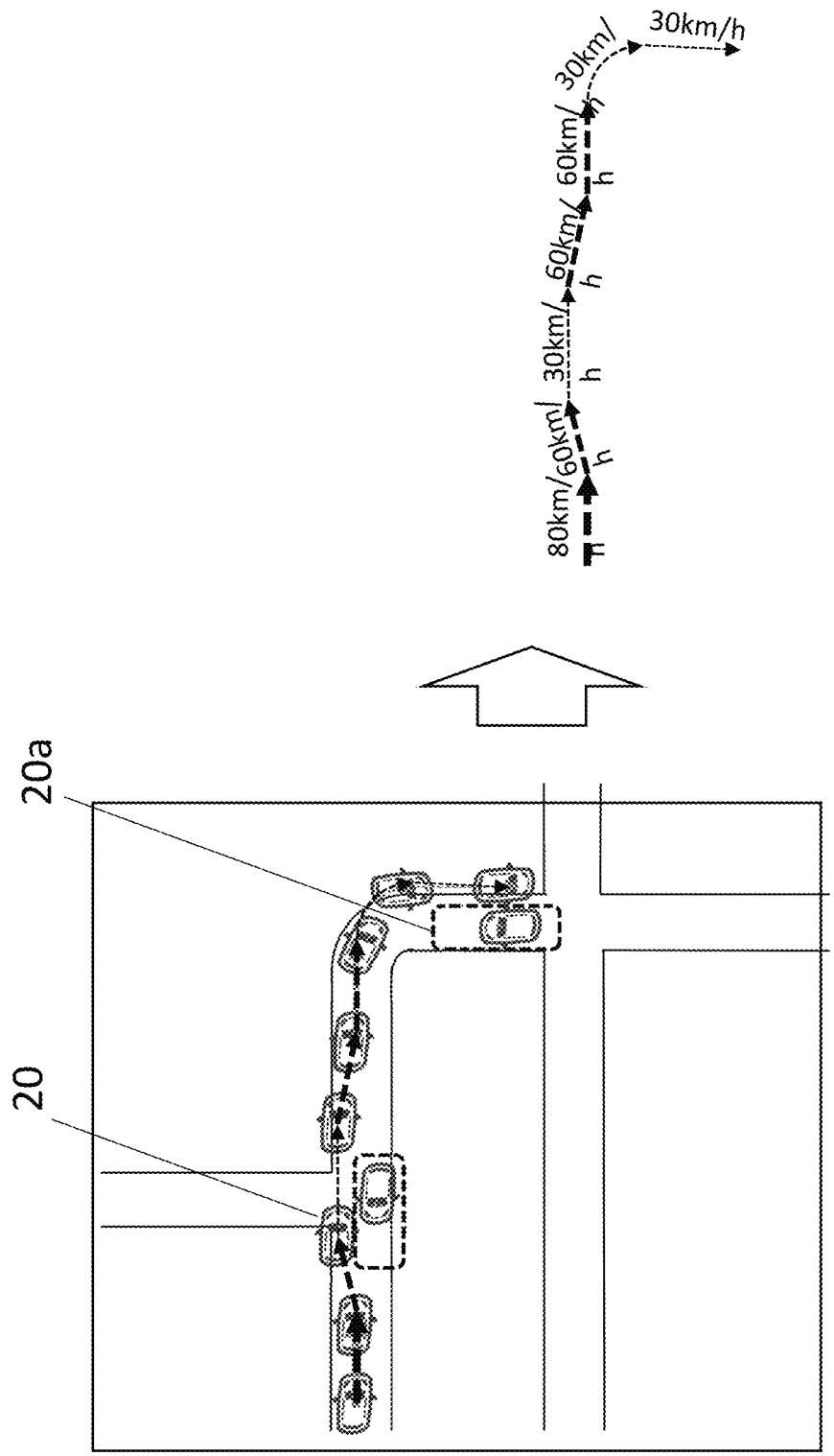
FIG. 6 is an illustration depicting one embodiment of a travel route when the vehicle intends to travel the route provided by the cellular automaton, in which the rules of the active matter layer provide an deviation by the autonomous vehicle from the route provided by the cellular automaton to avoid impact with the peripheral vehicle.

FIG. 6 illustrates one embodiment, of a travel route when the vehicle intends to travel the route provided by the cellular automaton layer, based on the above rule is an output of the active matter layer. All the parameters input to the active matter layer will be recorded in the storage device 32 and can arbitrarily be read out. The recorded pieces of information are associated with the specific scenarios finally output and are used when the intended scenarios are reproduced. In FIG. 6, a peripheral vehicle 20a is on the route provided by the cellular automaton. The rules of the active matter layer provide a deviation by the autonomous vehicle 20 from the route provided by the cellular automaton to avoid impact with the peripheral vehicle 20a. The rules may include the application of an individual behavior of a vehicle 44 from FIG. 5.

In some embodiments, defining the detailed behavior of vehicles by an active matter layer's rule is provided by an active matter layer generator 33b of the system 500 for automatic scenario generation.

Referring to block 12 of FIG. 1, the method may further include modifying behavior of vehicles by applying a driver agent layer rule. In some embodiments, by applying driver agent rule, block 12 of the method can produce the effect of the output from the active matter layer and the cellular automaton layer at blocks 10 and 11, respectively.

In some embodiments, the method generates changes in behavior caused by personalities, by means of the driver agent layer. The role of the driver agent layer is to add irregular changes caused by drivers' personalities and conditions to the rule-based behaviors calculated by the cellular automaton and the active matter. The driver agent layer has a set of coefficient value which affects to input or output of cellular automaton/active matter layer under the situation each vehicles are placed.

Figure 7:
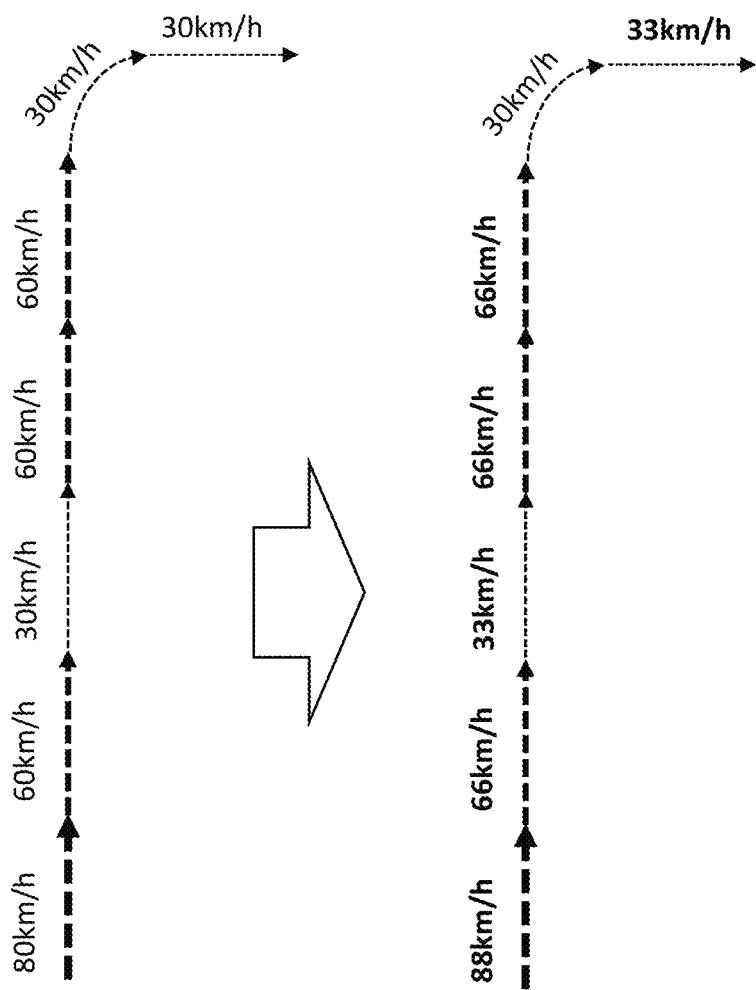
FIG. 7 illustrates one example of the speed of a driver agent for the cellular automaton layer, and the effect of a driver agent illustrating the nature of a young driver.
Figure 8:
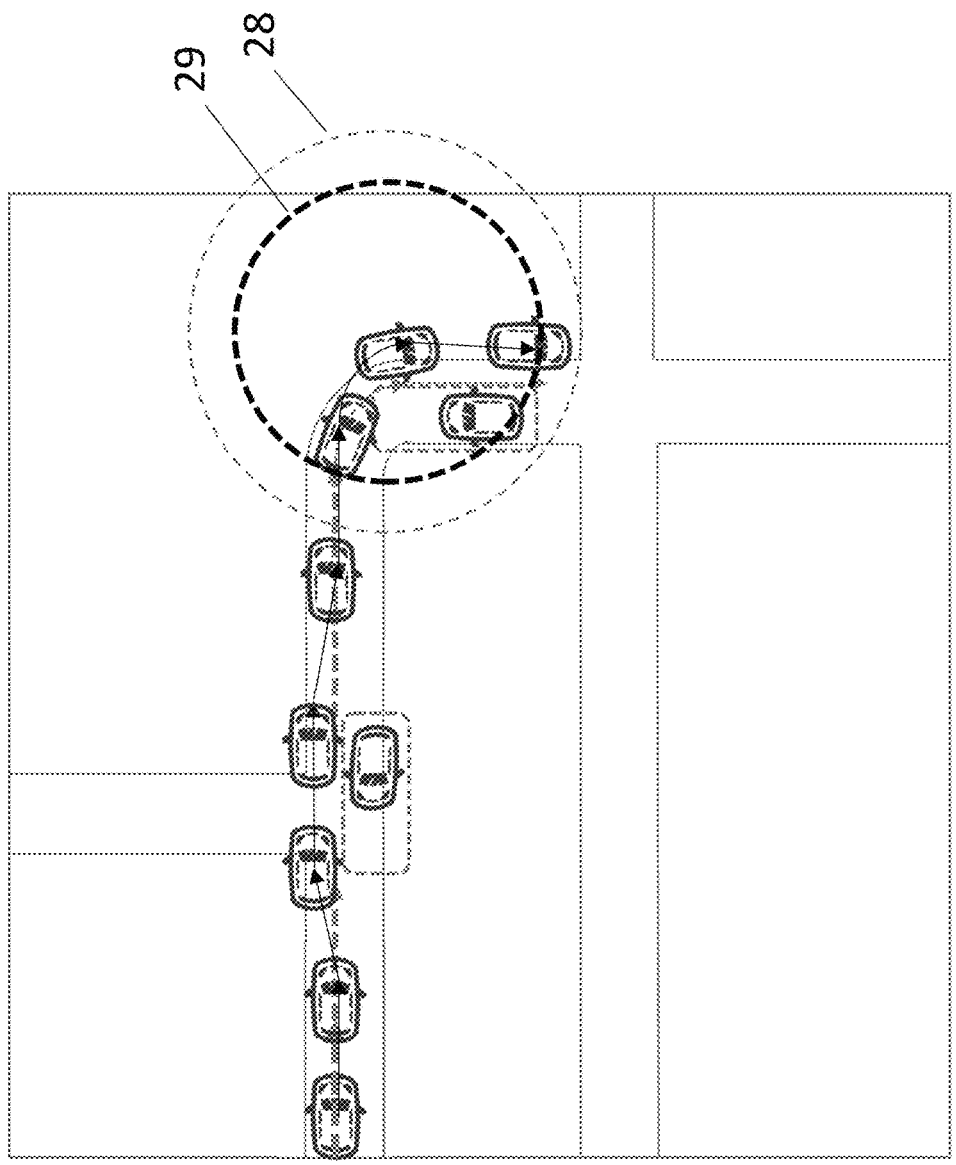
FIG. 8 illustrates another example of a driver agent expressing the nature of how an elder driver narrows the perception area in which the active matter can recognize other vehicles in the periphery by 25%, on the travel route output by the cellular automaton.

For example, a driver agent expressing the nature of "young driver" increases the speed during straight travelling by 10%. FIG. 7 illustrates one example of the speed of a driver agent for the cellular automaton layer, and the effect of a driver agent expressing the nature of a young driver, e.g., increase in speed of 10%. FIG. 8 illustrates another example of a driver agent expressing the nature of "elder driver" narrows the area in which the active matter can recognize other vehicles in the periphery by 25%, on the travel route output by the cellular automaton. The original periphery outputted by the cellular automaton layer is identified by reference number 29. The reduced periphery outputted by the cellular automaton layer following a driver agent expressing an elder driver is identified by reference number 28.

In some embodiments, defining the driver agent for the driver agent layer is provided by a driver agent layer generator 33c of the system 500 for automatic scenario generation. All the parameters inputted to the driver agent will be recorded in the storage device and can arbitrarily be read out. The recorded pieces of information are associated with the specific scenarios, and are used when the intended scenarios are reproduced.

Referring to FIG. 1, in some embodiments, the method may continue to block 13. Block 13 includes uniting layers, e.g., the cellular automaton layer, the active matter layer, and the driver agent layer. If simulation termination conditions are met, output result above as a verification scenario. If not, the method can convert the result above into form of input for the application of the cellular automaton layer at block 9, and repeating the applications of the cellular automaton layer at block 9, the defining the behavior of vehicles by applying the active matter layer rule at block 11, and modifying behavior of the vehicles by applying the drive agents rule at block 12.

The output results from the cellular automaton, the active matter layer and the driver agent layer will be combined and outputted as a verification scenario for each iteration. The output of the cellular automaton layer becomes an input to the active matter layer and is further refined. The cellular automaton and the active matter make an inquiry to the driver agent each iteration. The driver agent returns coefficient value which affect to result of input/output. Cellular automaton and active matter layer will re-calculate output after applying this coefficient value.

If the simulation termination conditions are not met, the output of each layer will be converted into inputs to the cellular automaton, and re-calculation by each layer and combination of output will be continued.

In some embodiments, the functions that are performed in block 13 of FIG. 1 may be provided by a scenario converging device 34 of the system 500 that is depicted in FIG. 2.

In some embodiments, the methods can reproduce an arbitrary verification scenario based on information stored in a storage area 32. Reproducing an intended verification scenario can include a calculation in each layer kept always unique by architecture. In some embodiments, the same value will be returned for the same input value. Therefore, an intended verification scenario can be reproduced by providing the pieces of information associated with the scenario and recorded in the storage device as input values for block 1, e.g., receiving the map data, and blocks 5, 6, and 7, e.g., generating the cellular automaton layer, generating the active matter layer and generating the driver agent layer, respectively. Likewise, an intended verification scenario can be reproduced from an intended iteration by providing pieces of information recorded in the storage device for blocks 9, 11 and 12, as input values for the respective layers.

Exemplary applications/uses to which the present invention can be applied include, but are not limited to providing guidance and navigation for autonomous vehicles.

In another aspect, a system 500 is provided for scenario generation for autonomous vehicle navigation. The system 500 may include a map extractor 31 for setting a pseudo random value. The system 500 may also include a cellular automaton layer generator 33a that defines a road network level behavior with at least one rule directed to pathways by vehicles on a passageway for travel; an active matter layer generator 33b that defines a vehicle level behavior with at least one rule directed to movement of the vehicles on an ideal route for the pathways by the vehicles for the passageway for travel; and a driver agent layer generator 33c that defines driving nature with at least one rule that impacts changes in the vehicle level behavior dependent upon a characterization of driver behavior. In some embodiments, the system 500 may further include a scenario converger 34 including at least one processor 35 for combining outputs from the cellular automaton layer, the active matter layer and the driver agent layer to generate scenario generation for autonomous vehicle navigation. In some embodiments, the combining of the outputs employ the pseudo random value to determine an order in the execution of the cellular automaton layer, the active matter layer and the driver agent layer. In some embodiments, the combining of the outputs employ the pseudo random value to determine a duration of execution of the cellular automaton layer, the active matter layer and the driver agent layer in generating the scenario generation for autonomous vehicle navigation. The output of the system 500 may be a navigation scenario 600 suitable for autonomous vehicle navigation.

In some embodiments, the system 500 may employ one or more processors 35, e.g., hardware processor devices, to perform instructions, such as calculations, as described illustrated in FIG. 1. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Each of the components for the system 500 for automatic scenario generation for autonomous driving vehicles that is depicted in FIG. 2 may be interconnected via a system bus 102.

Any of the systems or machines (e.g., devices) shown in FIG. 2 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to FIG. 1, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 9:
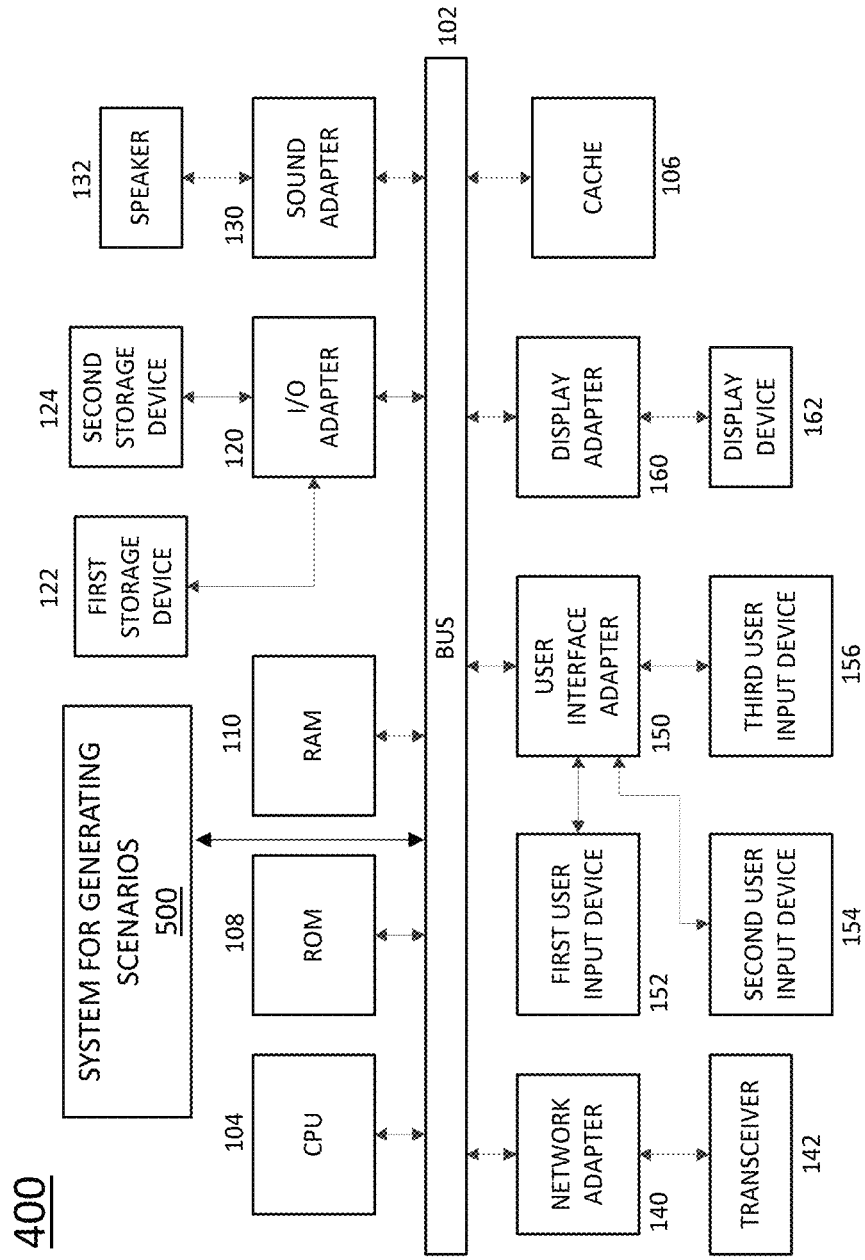
FIG. 9 is a block diagram illustrating a processing system that can incorporate the system for automatic scenario generation for autonomous vehicles depicted in FIG. 2, in accordance with one embodiment of the present disclosure.

The system 500 for automatic scenario generation for autonomous driving vehicles may be integrated into the processing system 400 depicted in FIG. 9. The system 500 for automatic scenario generation for autonomous driving vehicles includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 500 for automatic scenario generation for autonomous driving vehicles depicted in FIGS. 2 and 9, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the system 500 for automatic scenario generation for autonomous driving vehicles may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the system 500 for evaluating autonomous vehicle safety are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention. For example, the computer program product can provide for scenario generation for autonomous vehicle navigation. The computer program product may include a computer readable storage medium having program instructions embodied therewith, the program instructions executable by a processor. The program instructions can cause the processor to define a cellular automaton layer that defines a road network level behavior with at least one rule directed to pathways by vehicles on a passageway for travel. The program instructions can also cause the processor to define an active matter layer that defines a vehicle level behavior with at least one rule directed to movement of the vehicles on an ideal route for the pathways by the vehicles for the passageway for travel. The program instructions can also cause the processor to define a driver agent layer that defines driving nature with at least one rule that impacts changes in the vehicle level behavior dependent upon a characterization of driver behavior. The program instructions can also cause the processor to combine outputs, using the processor, from the cellular automaton layer, the active matter layer and the driver agent layer to provide scenario generations for autonomous vehicle navigation. The combining of the outputs employing a pseudo random value to determine at an order in the execution of the cellular automaton layer, the active matter layer and the driver agent layer and the duration of execution of the cellular automaton layer, the active matter layer and the driver agent layer in providing the scenario generations for autonomous vehicle navigation.

The computer readable storage medium can be a tangible device that can retain and store instructions for use by an instruction execution device. In some embodiments, the computer readable storage medium may be non-transitory. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
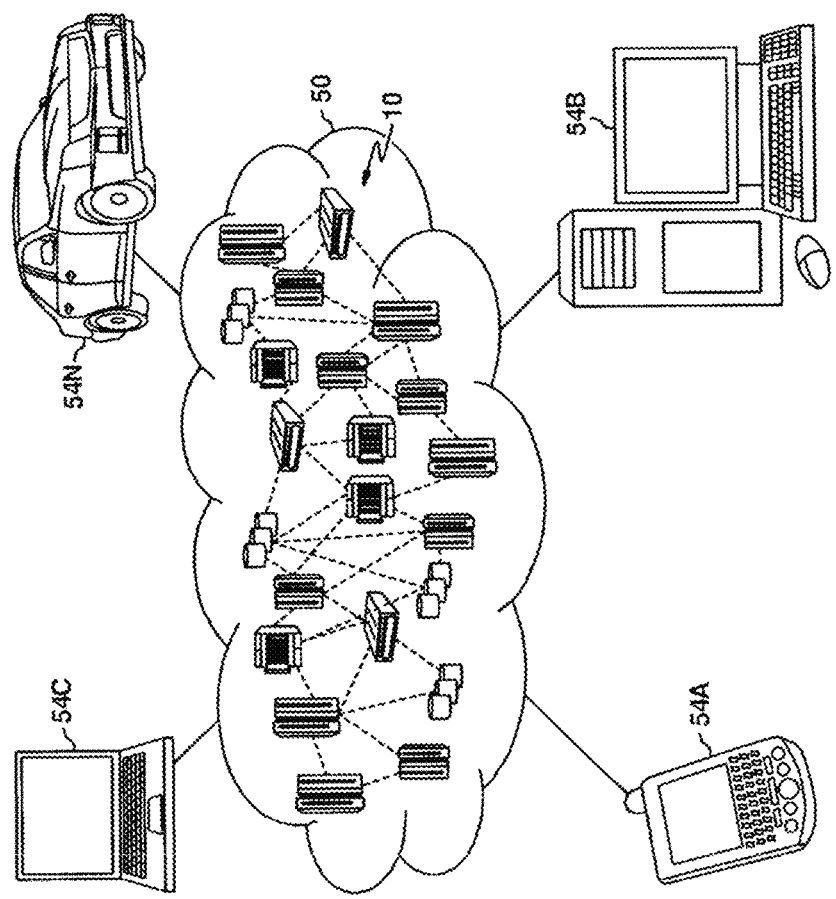
FIG. 10 depicts a cloud computing environment according to an embodiment of the present disclosure.

Referring now to FIG. 10, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 51 and cloud computing environment 50 can communicate with any type of computerized device over any type of network and/or network addressable connection (e.g., using a web browser).

Figure 11:
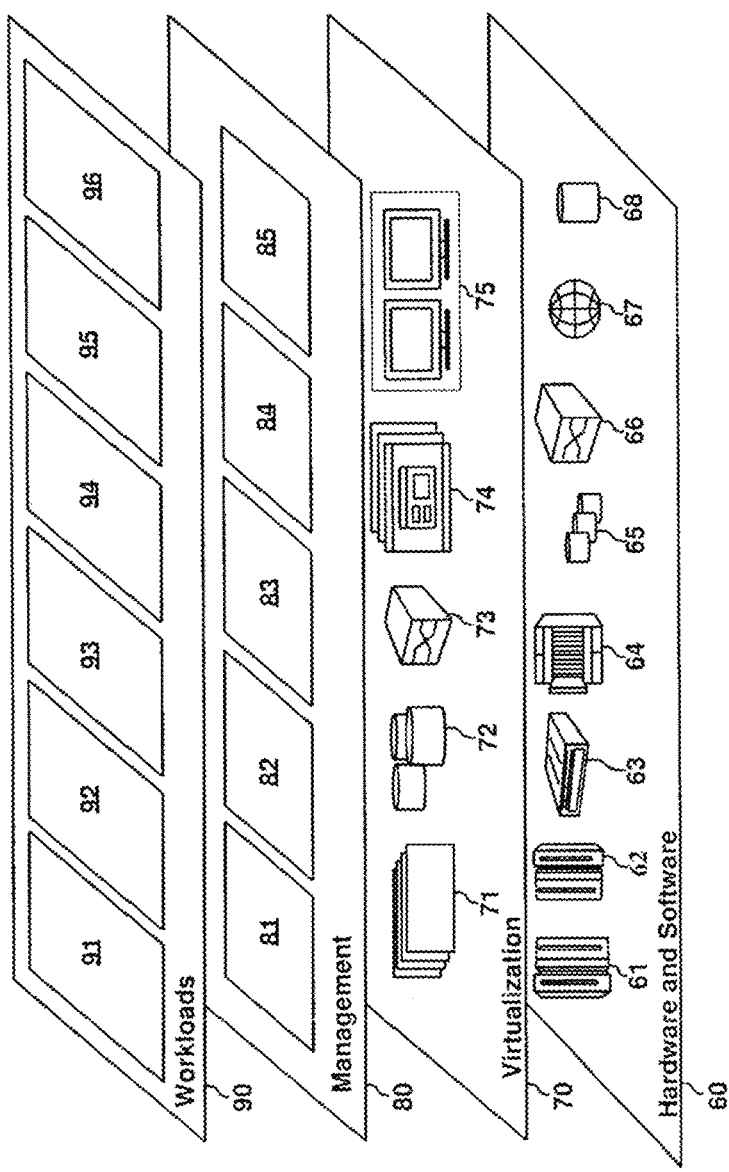
FIG. 11 depicts abstraction model layers according to an embodiment of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the system and method for automatic scenario generation for autonomous driving vehicles, which is described with reference to FIGS. 1-10.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for automatic scenario generation for autonomous driving (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for scenario generation for autonomous vehicle navigation comprising:
receiving input data including a map and driving rule information, the map including topography data comprising topography of a pathway for a vehicle, a topography of the passageway for travel of the vehicle, a direction of travel for the vehicle on the passageway for travel, the map also including motion behavior based upon positional relationships of vehicles on the map;
defining a cellular automaton layer from the topography data of the map that defines a road network level behavior with at least one rule directed to pathways by vehicles on a passageway for travel;
defining an active matter layer from the motion based behavior taken from the map provided in the input data, the active matter layer defines a vehicle level behavior with at least one rule directed to movement of the vehicles on an ideal route for the pathways by the vehicles for the passageway for travel, the vehicle level behavior including characteristics for difference in size of vehicles traveling on the pathways;
defining a driver agent layer using the driving rule information that defines driving nature with at least one rule that impacts changes in the vehicle level behavior dependent upon a characterization of driver behavior; and
combining outputs from the cellular automaton layer, the active matter layer and the driver agent layer to generate scenario generation for autonomous vehicle navigation; and
applying drivers to the scenario generation for autonomous vehicle navigation by employing a pseudo random value to determine a selection of paths from the cellular automaton layer by drivers in the execution of the cellular automaton layer, the active matter layer and the driver agent layer to determine the degree of how each of the cellular automaton layer, the active matter layer and the driver agent layer contribute to generating the scenario generation for autonomous vehicle navigation that is verified, the pseudo random value employing a seed value provided by a time stamp and the number of the pathways from the cellular automaton layer, the pseudo random value being a remainder from the seed value divided by the number of the pathways.

2. The computer implemented method of claim 1, wherein the at least one rule directed to pathway by vehicles on the passageway for travel includes at least one element defining a topography of the pathway for the vehicle, a topography of the passageway for travel, and a direction of travel for the vehicle on the passageway for travel.

3. The computer implemented method of claim 1, wherein the vehicle level behavior for the active matter layer comprises data selected from the group consisting of vehicle type, vehicle size, vehicle performance, and combinations thereof.

4. The computer implemented method of claim 1, wherein the characterization of driver behavior is in response to data selected from the group consisting of age, gender, vehicle selection, nationality and combinations thereof.

5. The computer implemented method of claim 4, wherein the changes in the vehicle level behavior are selected from the group consisting of changes in speed, changes in direction, changes in acceleration, changes in peripheral vision of drivers and combinations thereof.

6. The computer implemented method of claim 1, wherein the pseudo random value provides variation of the scenario being generated.

7. The computer implemented method of claim 6, wherein the pseudo random value is data selected from the group consisting of where the vehicle is located on the pathway, a velocity of the vehicle, the ideal route for the vehicle on the pathway, and combinations thereof.

8. The computer implemented method of claim 7, wherein the pseudo random value may be vehicle characteristic relative to a timestamp for the scenario generation.

9. The computer implemented method of claim 1, wherein the pseudo random value is saved for reproducibility of the scenario being generated.

10. A system for scenario generation for autonomous vehicle navigation comprising:
an input for receiving input data including a map and driving rule information, the map including topography data comprising topography of a pathway for a vehicle, a topography of the passageway for travel of the vehicle, a direction of travel for the vehicle on the passageway for travel, the map also including motion behavior based upon positional relationships of vehicles on the map;
an extractor for setting a pseudo random value;
a cellular automaton layer generator that defines a road network level behavior from the topography data of the map with at least one rule directed to pathways by vehicles on a passageway for travel;
an active matter layer generator that defines from the motion based behavior taken from the map provided in the input data, the active matter layer a vehicle level behavior with at least one rule directed to movement of the vehicles on an ideal route for the pathways by the vehicles for the passageway for travel, the vehicle level behavior including characteristics for difference in size of vehicles traveling on the pathways;
a driver agent layer generator that defines from the driving rule information driving nature with at least one rule that impacts changes in the vehicle level behavior dependent upon a characterization of driver behavior; and
a scenario converging device including at least one processor for combining outputs from the cellular automaton layer, the active matter layer and the driver agent layer to generate scenarios for autonomous vehicle navigation; and
a generator for applying drivers to the scenario generation for autonomous vehicle navigation by employing a pseudo random value to determine a selection of paths from the cellular automaton layer by drivers in the execution of the cellular automaton layer, the active matter layer and the driver agent layer to determine the degree of how each of the cellular automaton layer, the active matter layer and the driver agent layer contribute to generate the scenarios that are verified, the pseudo random value employing a seed value provided by a time stamp and the number of the pathways from the cellular automaton layer, the pseudo random value being a remainder from the seed value divided by the number of the pathways.

11. The system of claim 10, wherein the combining of the outputs employing the pseudo random value determines an order in the execution of the cellular automaton layer, the active matter layer and the driver agent layer.

12. The system of claim 10, wherein the combining of the outputs employing the pseudo random value determines a duration of execution of the cellular automaton layer, the active matter layer and the driver agent layer in generating the scenario generation for autonomous vehicle navigation.

13. The system of claim 10, wherein the at least one rule directed to pathway by vehicles on the passageway for travel includes at least one element defining a topography of the pathway for the vehicle, a topography of the passageway for travel, and a direction of travel for the vehicle on the passageway for travel.

14. The system of claim 10, wherein the vehicle level behavior for the active matter layer comprises data selected from the group consisting of vehicle type, vehicle size, vehicle performance, and combinations thereof.

15. The system of claim 10, wherein the characterization of driver behavior is in response to data selected from the group consisting of age, gender, vehicle selection, nationality and combinations thereof.

16. The system of claim 10, wherein the changes in the vehicle level behavior are selected from the group consisting of changes in speed, changes in direction, changes in acceleration, changes in peripheral vision of drivers and combinations thereof.

17. The system of claim 10, wherein the pseudo random value provides variation of the scenario being generated.

18. The system of claim 10, wherein the pseudo random value is data selected from the group consisting of where the vehicle is located on the pathway, a velocity of the vehicle, the ideal route for the vehicle on the pathway, and combinations thereof.

19. The system of claim 10, further comprising storage memory, wherein the pseudo random value is saved for reproducibility of the scenario in the storage memory.

20. A non-transitory computer program product for scenario generation for autonomous vehicle navigation, the computer program product comprising a computer readable storage medium having program instructions embodied therewith, the program instructions executable by a processor to cause the processor to:

receive input data including a map and driving rule information, the map including topography data comprising topography of a pathway for a vehicle, a topography of the passageway for travel of the vehicle, a direction of travel for the vehicle on the passageway for travel, the map also including motion behavior based upon positional relationships of vehicles on the map;

define a cellular automaton layer from the topography data of the map, using the processor, that defines a road network level behavior with at least one rule directed to pathways by vehicles on a passageway for travel;

defining an active matter layer from the motion based behavior taken from the map provided in the input data, the active matter layer defines a vehicle level behavior with at least one rule directed to movement of the vehicles on an ideal route for the pathways by the vehicles for the passageway for travel, the vehicle level behavior including characteristics for difference in size of vehicles traveling on the pathways;

define a driver agent layer with the driving rule information, using the processor, that defines driving nature with at least one rule that impacts changes in the vehicle level behavior dependent upon a characterization of driver behavior; and combine outputs, using the processor, from the cellular automaton layer, the active matter layer and the driver agent layer to provide scenario generations for autonomous vehicle navigation; and applying drivers to the scenario generation for autonomous vehicle navigation by employing a pseudo random value to determine to determine the degree of how each of the cellular automaton layer, the active matter layer and the driver agent layer contribute to providing the scenario generations for autonomous vehicle navigation that is verified, the pseudo random value employing a seed value provided by a time stamp and the number of the pathways from the cellular automaton layer, the pseudo random value being a remainder from the seed value divided by the number of the pathways.

* * * * *